United States Patent
Watanabe et al.

(10) Patent No.: US 6,317,699 B1
(45) Date of Patent: Nov. 13, 2001

(54) DEVICE AND METHOD FOR CALIBRATING A ROBOT

(75) Inventors: Shinsuke Watanabe; Yasuyuki Inoue; Hirotaka Morita; Hideo Nagata; Youichi Tanaka, all of Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 09/355,507

(22) PCT Filed: Jan. 16, 1998

(86) PCT No.: PCT/JP98/00164

§ 371 Date: Jul. 29, 1999

§ 102(e) Date: Jul. 29, 1999

(87) PCT Pub. No.: WO98/32571

PCT Pub. Date: Jul. 30, 1998

(30) Foreign Application Priority Data

Jan. 29, 1997 (JP) .................................... 9-031258

(51) Int. Cl.[7] ............................ G01B 21/00; B25J 13/00; B25J 9/10
(52) U.S. Cl. ............................... 702/94; 73/1.78; 700/254
(58) Field of Search .................... 702/94, 95; 73/1.78; 33/502; 700/254

(56) References Cited

U.S. PATENT DOCUMENTS

| | | | |
|---|---|---|---|
| 4,372,721 | * | 2/1983 | Harjar et al. ........................ 73/1.79 X |
| 4,892,457 | * | 1/1990 | Bartlett et al. ........................ 414/735 |
| 5,099,216 | * | 3/1992 | Pelrine ................................. 335/220 |
| 6,071,060 | * | 6/2000 | Campbell et al. ..................... 414/416 |

FOREIGN PATENT DOCUMENTS

| | | | |
|---|---|---|---|
| 62-148172 | * | 7/1987 | (JP) . |
| 62-297082 | * | 12/1987 | (JP) . |
| 4-365586 | * | 12/1992 | (JP) . |
| 5-77058 | * | 3/1993 | (JP) . |
| 5-261682 | * | 10/1993 | (JP) . |
| 5-329786 | * | 12/1993 | (JP) . |
| 6-274213 | * | 9/1994 | (JP) . |

OTHER PUBLICATIONS

*IBM Technical Disclosure Bulletin* NN 891285 vol. 32, No. 7, pp. 85–88 "Robot Wrist Calibration Method and Fixture" Dec. 1989.*

* cited by examiner

*Primary Examiner*—Thomas P. Noland
(74) *Attorney, Agent, or Firm*—Armstrong, Westerman, Hattori, McLeland & Naughton, LLP

(57) ABSTRACT

A calibrating device is composed of a movable portion having a degree of freedom movable in three axis directions orthogonal to each other, a displacement detector for detecting displacement of said movable portion as per degree of freedom, a universal joint having a three-axis rotating degree of freedom, which is attached to the tip end portion of said movable portion, a fixture attached to a free end of the universal joint, which is capable of being easily connected to the tip end portion of the wrist of the robot. The calibrating device measures displacement of the wrist tip end portion. That is, the invention provides a comparatively simple calibrating device and a calibrating method, in which automation is easy without requiring any complicated operations, using the calibrating device.

6 Claims, 8 Drawing Sheets

Fig. 6
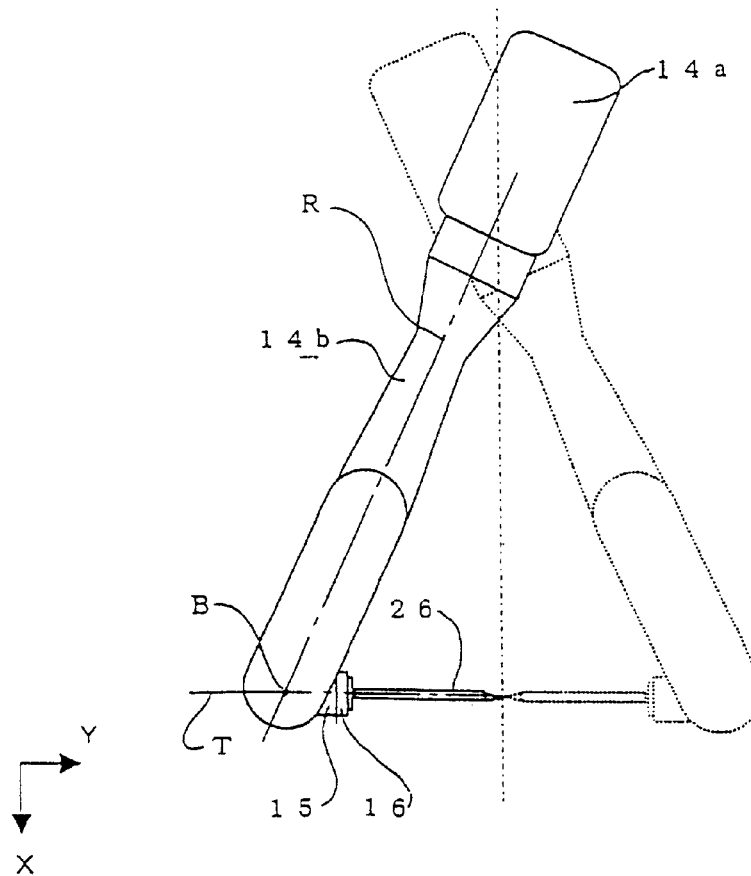
(a)
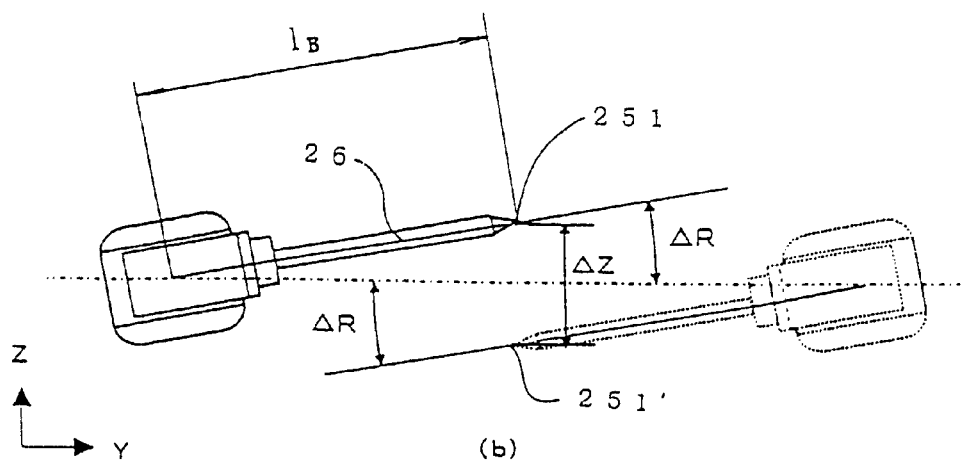
(b)

DEVICE AND METHOD FOR CALIBRATING A ROBOT

TECHNICAL FIELD

The present invention relates to a device and a method for calibrating a robot, and in particular to a device and a method for calibrating a robot by measuring a positional deviation of control points, which is produced when giving the robot an instruction to change only the robot posture while keeping the positions of the control points of the robot constant.

BACKGROUND ART

Generally, since in a robot, and in particular, an articulated robot, there is an error between parameters describing a geometrical construction of robot arms such as robot parameters held in a control device, that is, an angle between links in the origin posture, a turning angle between links, a distance between links, a link length, etc., and actual parameters of the robot, whereby an error is produced between the position and posture of the robot, which are recognized by the control device, and the actual position and posture of the robot. The position and posture of the robot which are recognized by the control device are compared with the actual position and posture of the robot, wherein the robot parameters which are held by the control device are corrected, and the correction of the error is called "calibration" or "calibrating".

As a first example of the prior arts of the robot calibration, there is a method disclosed in Japanese Laid-open Patent Publication No. 274213 of 1994. This is described as follows:

A plurality of reference points are fixed around a robot, a plurality of different postures are taught so that points of a tool attached to the wrist portion of a robot for each of the reference points are made coincident with these reference points, and the teaching points are registered. Repeating this procedure, teaching points equivalent to the quantity (the number of reference points x the number of postures) are registered. The correction amount is calculated by using the data of these teaching points.

However, with the first prior art art, since it is necessary that an operator operates keys of a teaching box while watching the tip end of a tool and carries out a micro positioning of a robot, there is a shortcoming, by which the operation is very cumbersome and takes much time.

The second example of the prior arts in order to solve this shortcoming was disclosed by Japanese Laid-open Patent Publication No. 261682 of 1993. This is described as follows:

This method is such that a calibrating device which has a six-axis degree of freedom in action and has displacement detecting feature for the degree of freedom in each axis is mounted in a place where the relative positional relationship from a robot is already known or can be accurately measured, and the tip end portion of the calibrating device is mechanically connected to the tip end portion of the wrist of the robot, whereby robot calibration is carried out by inversely calculating position data and posture data of the robot based on position data and posture data obtained from the displacement detecting means of the calibrating device.

However, there were the following problems in the second example of prior arts.
(1) Since the calibrating device has displacement detecting features consisting of six degree of freedoms, it is complicated and expensive.
(2) In addition, it is difficult to accurately measure the relative positional relation and posture between the calibrating device and a robot.

DISCLOSURE OF INVENTION

Therefore, it is an object of the invention to provide a comparatively simple calibrating device and a calibration method which can be easily automated.

In order to solve the problems, with the present invention, a calibrating device, which comprises a movable portion having a degree of movemental freedom in three axis directions orthogonal to each other, a displacement detecting means for detecting the displacement of the movable portion for each degree of freedom, a universal joint having a degree of turning freedom in three axes, which is attached to the tip end portion of the movable portion, and a fixture, which is attached to the free end of the universal joint and can be detachably attached easily to the tip end portion of the wrist of the robot, is fixed at an optional place in the vicinity of the robot, wherein the tip end portion of the wrist of the robot is fixed at the fixture of the calibrating device, such a command, which changes only the posture of the robot without moving the center point of the rotary axis of the universal joint, is provided for the robot in order to actuate the robot, displacement of the movable portion of the calibrating device, which is produced at this time, is measured by the displacement detecting means, and a correction amount is calculated from the measured displacement value.

BRIEF DESCRIPTION OF DRAWINGS

FIG. 6 is the second explanatory view of a calibration method according to the preferred embodiment.

BEST MODE FOR CARRYING OUT THE INVENTION

Hereinafter, a description is given of the preferred embodiments of the invention with reference to the accompanying drawings.

Figure 1:
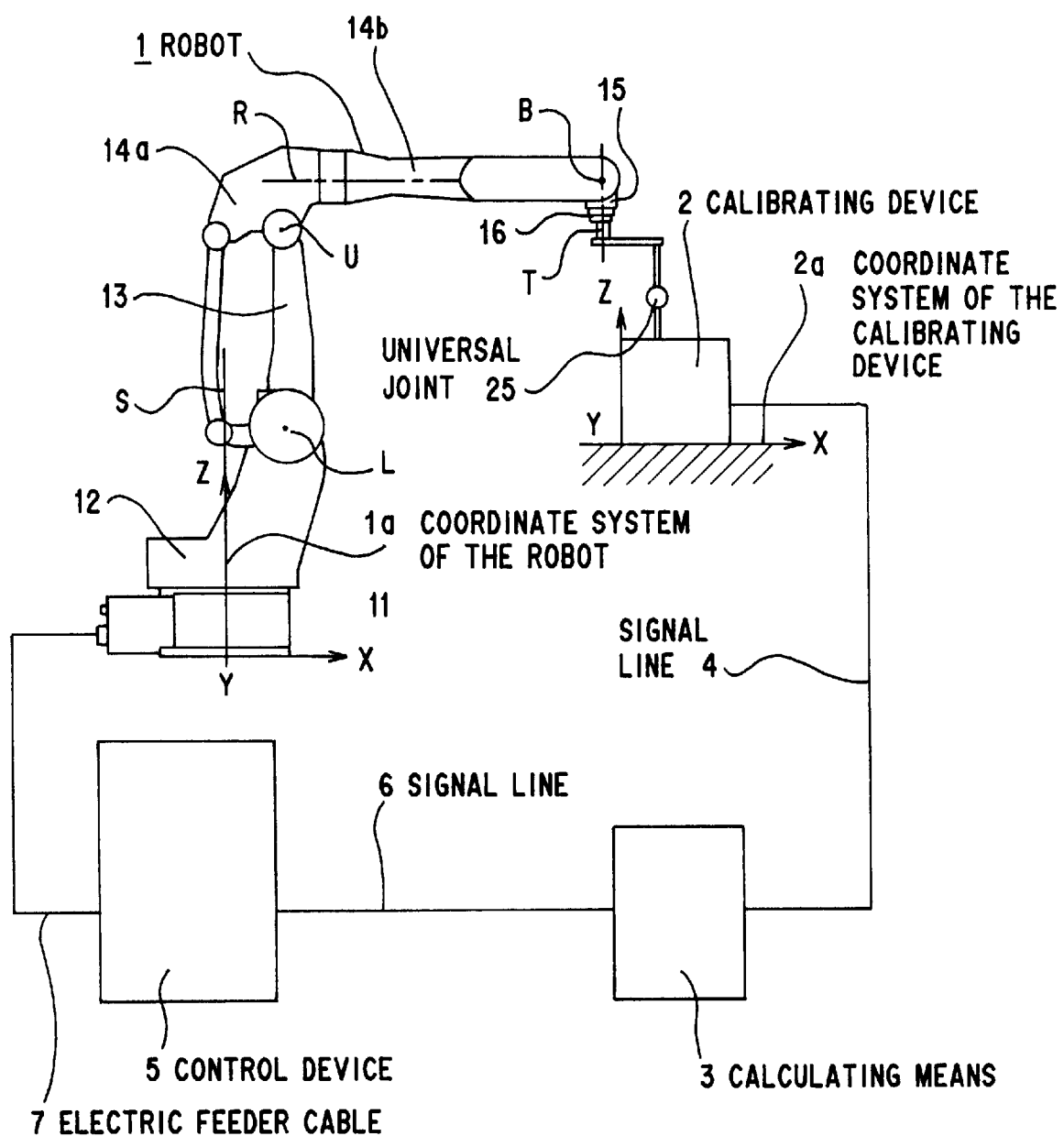
FIG. 1 is a configurational view showing a preferred embodiment.

FIG. 1 is a configurational view of a preferred embodiment of the invention.

In FIG. 1, a robot 1 is an object to be calibrated. A base of the robot 1 is indicated by 11, and a swivel head is indicated by 12. The swivel head 12 is attached to the base 11 so as to swivel around a vertical axis S. A lower arm is indicated by 13, which is attached to the swivel head 12 rockably around a horizontal axis L. The horizontal axis L is an axis penetrating the paper of the drawing from the surface to the rear. A fixing portion of an upper arm is indicated by 14a, which is attached to the lower arm 13 rockably around a horizontal axis U. The horizontal axis U is an axis penetrating the paper of the drawing from the surface to the rear. A rotating portion of the upper arm is indicated by 14b, which is attached to the fixing portion 14a of the upper arm rotatably around a rotating axis R. The rotating axis R is an axis extending in the lengthwise direction of the rotating portion 14b of the upper arm and is orthogonal to the horizontal axis U. A wrist portion is indicated by 15, which is attached to the rotating portion 14b of the upper arm rockably around a rocking axis B. The rocking axis B is an axis penetrating the paper of the drawing from the surface to the rear and is orthogonal to the rotating axis R. The tip end portion of the wrist is indicated by 16, which is attached to the wrist portion 15 rotatably around a rotating axis T. The rotating axis T is orthogonal to the rotating axis B.

A calibrating device is indicated by 2. The robot 1 and calibrating device 2 are, respectively, installed at their own installation place. At this time, the orientation of the robot 1 is matched to that of the calibrating device 2 so that a coordinate system 1a of the robot 1 becomes coincident with a coordinate system 2a of the calibrating device 2. However, the origin of the coordinate system 1a may become different from that of the coordinate system 2a.

The calibrating device 2 is provided with a universal joint 25, whereby the tip end portion 16 of the wrist of the robot 1 is mechanically linked with the calibrating device 2 via the universal joint 25.

A calculating means is indicated by 3, which is electrically connected to the calibrating device 2 via a signal line 4. The calculating means 3 is, for example, a personal computer having appointed programs incorporated.

A control device of the robot 1 is indicated by 5, which is electrically connected to the calculating means 3 via a signal line 6, and the control device 5 is electrically connected to the robot 1 via an electric feeder cable 7.

Next, a detailed description is given of the structure of the calibrating device.

Figure 2:
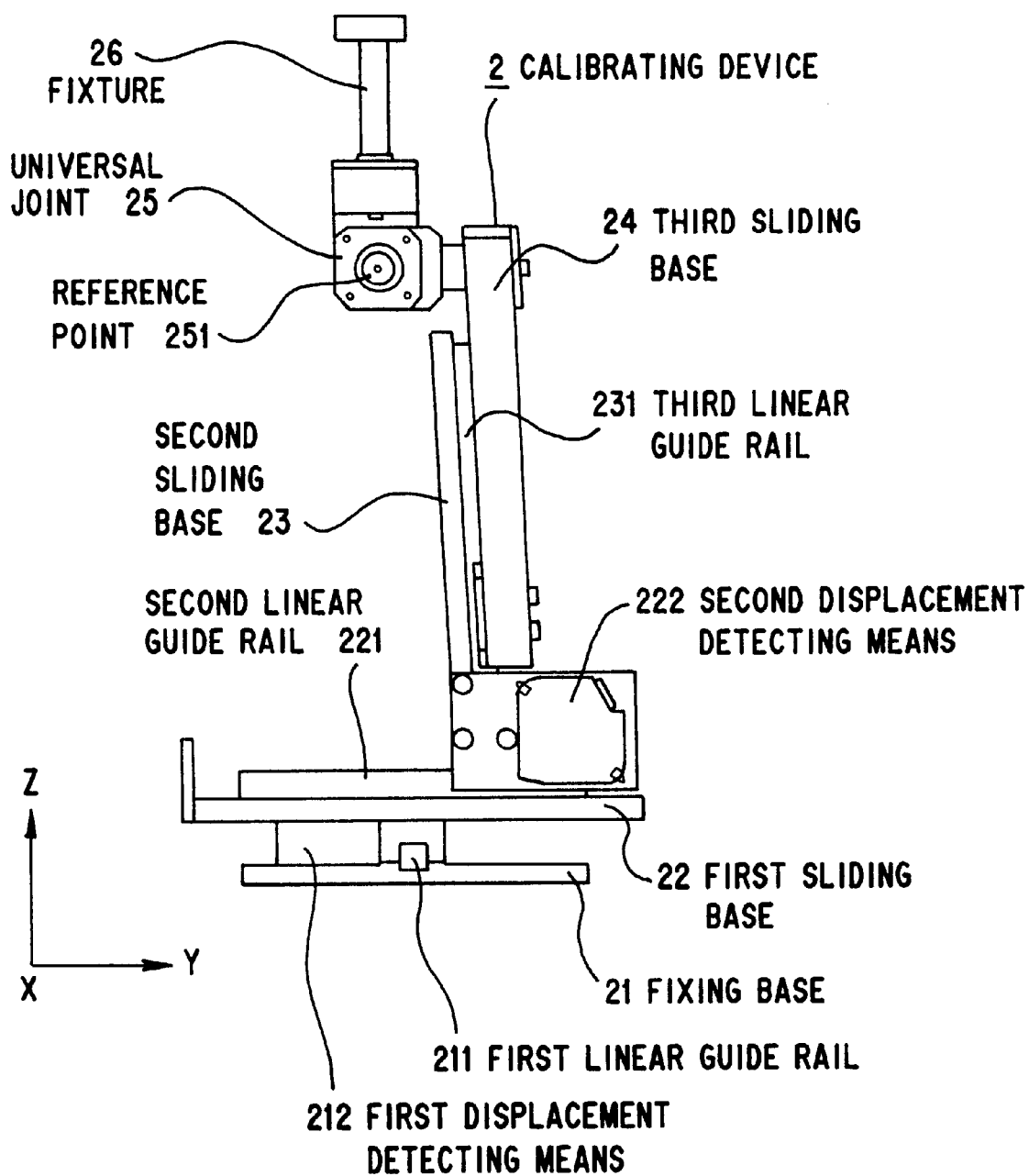
FIG. 2 is a front elevational view of a calibrating device according to the preferred embodiment.
Figure 3:
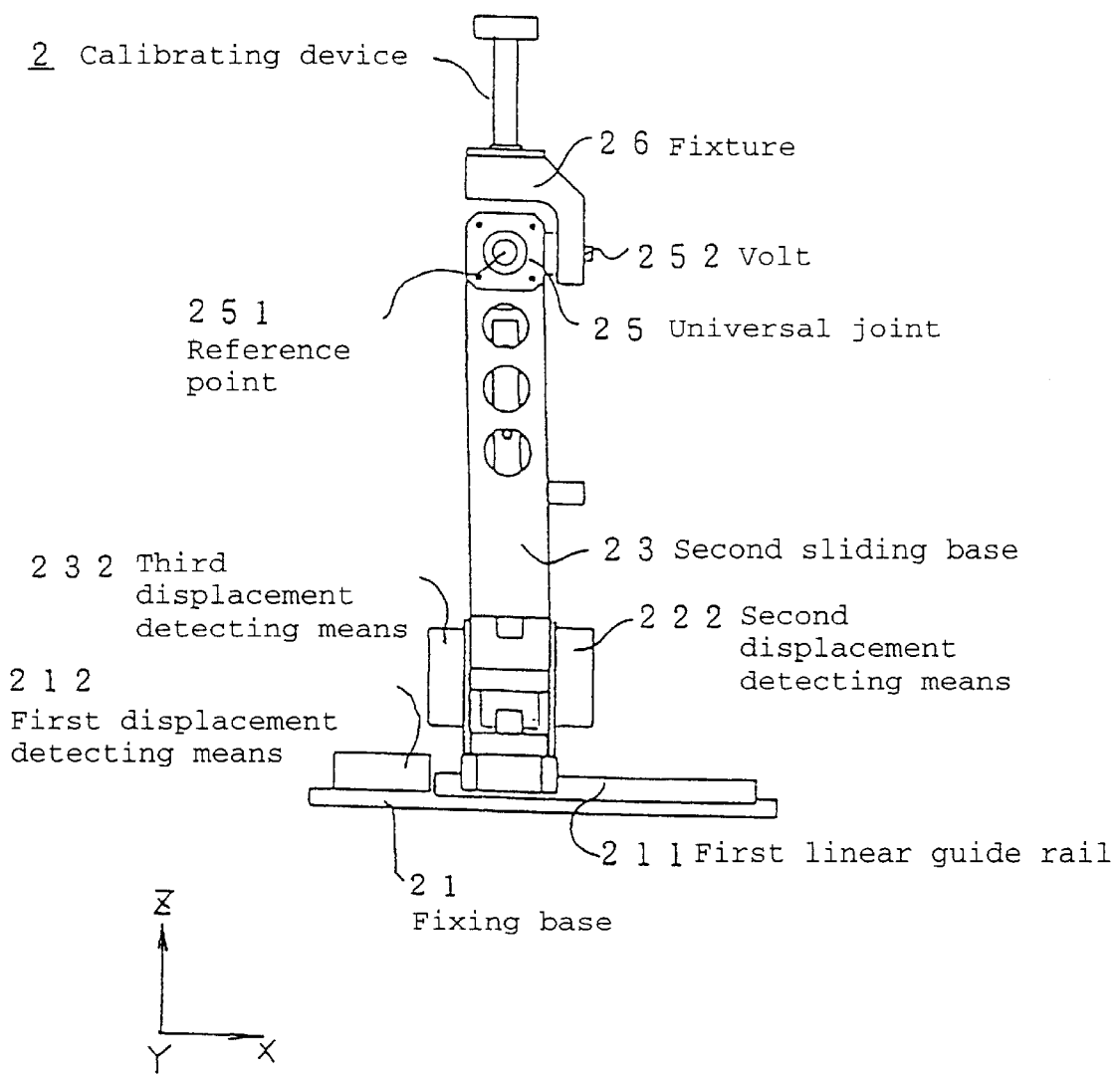
FIG. 3 is a side elevational view of a calibrating device according to the preferred embodiment.

FIG. 2 is a front elevational view of the calibrating device 2, and FIG. 3 is a side elevational view of the calibrating device 2.

In these drawings, a fixing base is indicated by 21. The fixing base 21 is provided with a first linear guide rail 211 and a first displacement detecting means 212. The first linear guide rail 211 faces in the forward and backward directions (hereinafter called "X" axis) of the calibrating device 2.

The first slide base is indicated by 22, which is slidably retained by the first linear guide rail 211. That is, the first slide base 22 has a degree of freedom in the X axis direction. In addition, movement of the first slide base 22 is accurately measured by the first displacement detecting means 212. Furthermore, the first slide base 22 is provided with a second linear guide rail 221 and a second displacement detecting means 222. The second linear guide rail 221 faces in the left and right directions (hereinafter called "Y" axis) of the calibrating device 2.

The second slide base is indicated by 23, which is slidably retained by the second linear guide rail 221. That is, the second slide base 23 has a degree of freedom in the Y axis direction. In addition, movement of the second slide base 23 is accurately measured by the second displacement detecting means 222. Further, the second slide base 23 is provided with a third linear guide rail 231 and a third displacement detecting means 232. The third linear guide rail 231 faces in the up and down directions (hereinafter called "Z" axis) of the calibrating device 2.

The third slide base is indicated by 24, which is slidably retained by the third linear guide rail 231. That is, the third slide base 24 has a degree of freedom in the Z axis direction. In addition, movement of the third slide base 24 is accurately measured by the third displacement detecting means 232.

Thus, the third slide base 24 can freely move in three axes orthogonal to each other, that is, X, Y and Z axis directions, with respect to the fixing base 21, and the movement amounts can be accurately measured, independently on the respective axes, by the first, second and third displacement detecting means 212, 22 and 232.

Further, the first, second and third displacement detecting means 212, 222, and 232 can accurately measure changes in distance, and may be such that the results of the measurement can be outputted in the form of signals which can be processed by a calculation device 3. In such displacement detecting means, there are various types in which, for example, a laser beam is used, or an electromagnetic means is used.

A universal joint is indicated by 25, one end of which is fixed at the third slide base 24, and the other end of which (free end) can freely rotate around the three axes orthogonal to each other. A reference point is indicated by 251, which is the cross point of the three rotating axes of the universal joint. That is, the reference point 251 is the center point whose position is not changed even though the free end of the universal joint 25 is changed.

A fixture is indicated by 26, one of which is linked with the free end of the universal joint 25 by a bolt 252, and the other of which has a structure which can be connected to the tip end portion 16 of the wrist of the robot 1. The fixture 26 can easily be connected to or disconnected from the universal joint 25 by attaching or detaching the bolt 252.

Figure 4:
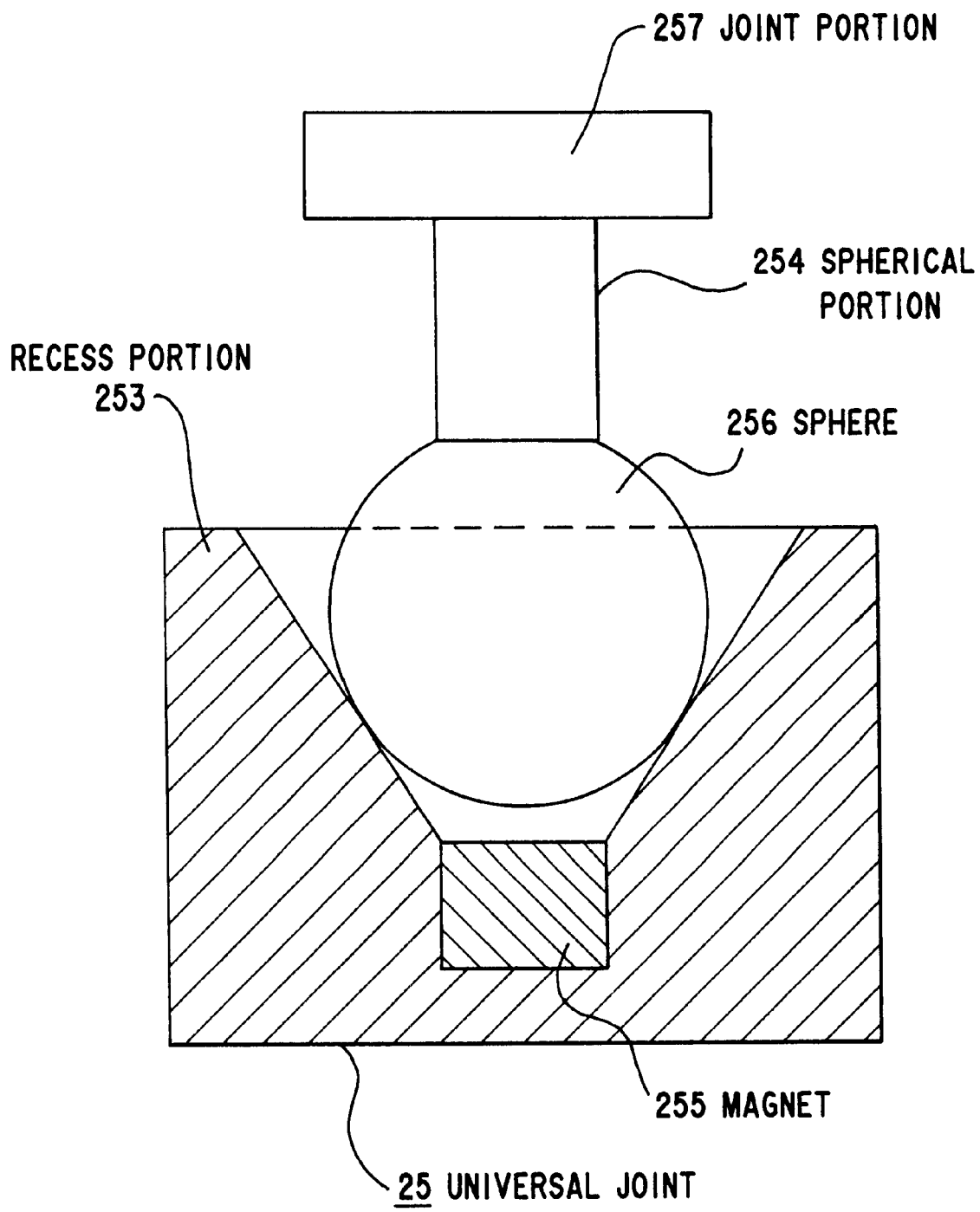
FIG. 4 is a front elevational sectional view of a universal joint according to another preferred embodiment.

In addition, the universal joint 25 is a universal joint of a generally known structure. However, it may be constructed as shown below:

FIG. 4 is a cross-sectional view of a universal joint according to another preferred embodiment of the invention.

In the drawing, a universal joint is indicated by 25, which consists of a recess 253 and a spherical portion 254. The recess 253 is a metal block having a precisely machined conical trapezoidal hole at the center and having a magnet 255 on the bottom, and is fixed at a slide base of a calibrating device (not illustrated). The spherical portion 254 is composed of a precise sphere 256 made of magnetic metal, and a joint portion 257. The sphere 256 is disposed so as to clog the hole of the recess 253 and is retained by a magnetic force of the magnet 255. The joint portion 257 is connected to a fixture of the calibrating device (not illustrated).

Since the spherical portion 254 is retained in the conical trapezoidal hole of the recess 253 by the magnet 255, the spherical portion 253 can freely rotate in the three axis directions with the center of the sphere 256 kept at a fixed position with respect to a comparatively small external force. That is, the spherical portion 253 functions as a general universal joint.

If a greater external force than the force of the magnet 255 is given to the spherical portion 254, the linkage between the spherical portion 254 and the recess 253 is cancelled, whereby mechanical connection and separation between the robot and calibrating device become easy.

Next, a description is given of a first preferred embodiment of a calibrating method effected by a calibrating device according to the invention. Herein, a case is selected where, with respect to a six-axis vertical articulated robot, a link angle at the origin posture is the object to be corrected, that is, where the origin error vector $\Delta\Theta$ is obtained. However, where correction is carried out for other parameters, the principle and procedure are the same as below:

(1) A calibrating device 2 is fixed at an optional place in the range of motion of the robot 1. At this time, the posture of the calibrating device 2 is adjusted to such an orientation where the coordinate system 2a of the calibrating device 2 is made coincident with the coordinate system 1a of the robot 1.

(2) The bolt 252 is removed, and linkage of the fixture 26 with the universal joint 25 is cancelled, wherein the fixture 26 is connected to the tip end portion 16 of the wrist of the robot 1.

(3) The posture of the robot 1 is changed by carrying out a teaching operation, whereby the fixture 26 connected to the tip end portion 16 of the wrist of the robot 1 is placed at a position of the universal joint 25, and the fixture 26 is connected to the universal joint 25 again. Thus, the robot 1 is connected to the calibration unit 2.

(4) The coordinate values (X1, Y1 and Z1) of the calibrating device, which are obtained by the displacement detecting means 212, 222, and 232 are stored in the calculation device 3.

(5) Such an instruction changes only the posture of the robot 1 without moving the cross point of the three rotating axes of the universal joint 25, in that the reference point 251, is given to the robot 1, thereby changing the posture of the robot 1. Since the positional relationship between the tip end portion 16 of the wrist of the robot 1 and the reference point 251 can be sufficiently and accurately determined in advance by measuring the mechanical dimensions between the fixture 26 and universal joint 25, the instruction (command) can be made easy if this value is used.

(6) At this time, the coordinate values (X2, Y2 and Z2) of the calibrating device, which are obtained by the displacement detecting means 212, 222 and 232 are stored in the calculation device 3.

Next, a description is given of a calculation procedure to determine correction values of robot parameters using the coordinate values obtained by the operations.

If the robot parameters used in internal control calculations of the control device 5 of the robot 1 are coincident with those of an actual robot 1, (X1, Y1 and Z1) and (X2, Y2 and Z2) show the same values, respectively. However, since the reference point 251 which does not essentially move moves by errors of the robot parameters, some errors arise.

The deviations $\Delta X$, $\Delta Y$ and $\Delta Z$ of the reference point 251 based on the coordinate system of the robot 1 are expressed by the following expressions:

$$\Delta X = X2 - X1$$
$$\Delta Y = Y2 - Y1 \quad (1)$$
$$\Delta Z = Z2 - Z$$

Herein, where it is assumed that the coordinate values shown by the calibrating device 2, when there is no error in the robot parameters, are (X0, Y0 and X0), the following relationship can generally be established, in the case of a six-axis robot, an error between the coordinate values (X1, Y1 and Z1) obtained by the first measurement and (X0, Y0 and Z0), and the origin error vector $\Delta\Theta$:

$$\begin{pmatrix} \partial x/\partial\theta 1 & \partial x/\partial\theta 2 & \partial x/\partial\theta 3 & \partial x/\partial\theta 4 & \partial x/\partial\theta 5 & \partial x/\partial\theta 6 \\ \partial y/\partial\theta 1 & \partial y/\partial\theta 2 & \partial y/\partial\theta 3 & \partial y/\partial\theta 4 & \partial y/\partial\theta 5 & \partial y/\partial\theta 6 \\ \partial z/\partial\theta 1 & \partial z/\partial\theta 2 & \partial z/\partial\theta 3 & \partial z/\partial\theta 4 & \partial z/\partial\theta 5 & \partial z/\partial\theta 6 \end{pmatrix} \Delta\Theta = \begin{pmatrix} X1 - X0 \\ Y1 - Y0 \\ Z1 - Z0 \end{pmatrix} \quad (2)$$

A (3,6) matrix of the left side of the espression is called a "Jacobian matrix," which expresses the relationship in minute displacement between the orthogonal coordinates (x, y and z) of a robot and between-link angles ($\theta 1$, $\theta 2$, $\theta 3$, $\theta 4$, $\theta 5$, and $\theta 6$). The matrix can be simply led out, in general industrial robots not having a redundant degree of freedom. If the matrix is substituted by J1, the expression becomes as follows;

$$J1\Delta\Theta = \begin{pmatrix} X1 - X0 \\ Y1 - Y0 \\ Z1 - Z0 \end{pmatrix} \quad (3)$$

As in the, as for the coordinate values (X2, Y2 and Z2) of the calibrating device 2, which are measured by changing the posture of the robot 1, the following expression can be established.

$$J2\Delta\Theta = \begin{pmatrix} X2 - X0 \\ Y2 - Y0 \\ Z2 - Z0 \end{pmatrix} \quad (4)$$

The following expression can be obtained by subtracting the expression (3) from the expression (4).

$$(J2-J1)\,\Delta\Theta = (X2-X1,\,Y2-Y1,\,Z2-Z1)^T = (\Delta X,\,\Delta Y,\,\Delta Z)^T \quad (5)$$

Therefore, the origin error vector $\Delta\Theta$ can be established by the following expression.

$$\Delta\Theta = (J2-J1)^{-1}\,(\Delta X,\,\Delta Y,\,\Delta Z)^T \quad (6)$$

Thus, the correction amounts of the link angles at the origin posture can be determined on the basis of the coordinate values measured by the calibrating device 2.

In addition, there are some cases where the respective expressions which become elements of the expressions (3) and (4) do not become independent by only the measurement for the same reference point in some postures of the robot 1. In these cases, it is possible to lead out independent expressions by carrying out similar measurements of multiple postures while changing the position of the reference point 251 in the range of motion of the calibrating device 2.

The calculations are carried out in the calculating means 3, and the results of the calculation of the origin error vector $\Delta\Theta$ is sent into the control device 5 via a signal line 6, thereby correcting the between-link angle at the origin posture of the robot 1, wherein the calibration is completed.

Further, in order to raise the reliability of the solution, various postures are taken at the same reference point, and measurements are repeated, or measurements and calculations are repeated while moving the reference point, wherein a plurality of solutions are obtained, and an averaging process may be carried out.

Next, a description is given of a second preferred embodiment of a calibration method by a calibrating device according to the invention.

(1) The robot 1 is connected to the calibrating device 2, and the coordinate values of the calibrating device 2 are measured (First measurement).

(2) In a state where the reference point 251 is not moved, the robot 1 is moved by providing an instruction by which the posture of the robot 1 is changed, and at this time, the coordinate values of the calibrating device 2 are measured (Second measurement).

(3) An instruction, by which the reference point 251 is moved by only the deviation between the coordinate values of the first measurement and the coordinate values of the second measurement, is given to the robot 1 to move it.

(4) The coordinate values of the calibrating device 2 are measured, and an instruction by which the reference point 251 is moved by only the deviation between the measured values and the first measurement values, is provided to the robot 1 to move it. The operation is repeated until a difference between the measured values of the calibrating device 2 and the first measurement values enters within an appointed level.

With the procedures, the between-link angle of the respective axes of a robot, when another posture is taken with the same reference point, can be obtained. The operations are executed with respect to a plurality of postures at the reference point to collect data of the between-link angles, whereby a correction amount can be calculated by a method disclosed in Japanese Laid-open Patent Publication No. 274213 of 1994.

Next, a description is given of a third preferred embodiment of a calibration method by a calibrating device according to the invention. The third preferred embodiment shows a method for individually calibrating the respective axes of a robot one by one in the order of a rocking axis B, a rotating axis R, a horizontal axis U, and a horizontal axis L. A description of the rotating axis T and vertical axis S is omitted because the origins thereof may be optionally determined.

Figure 5:
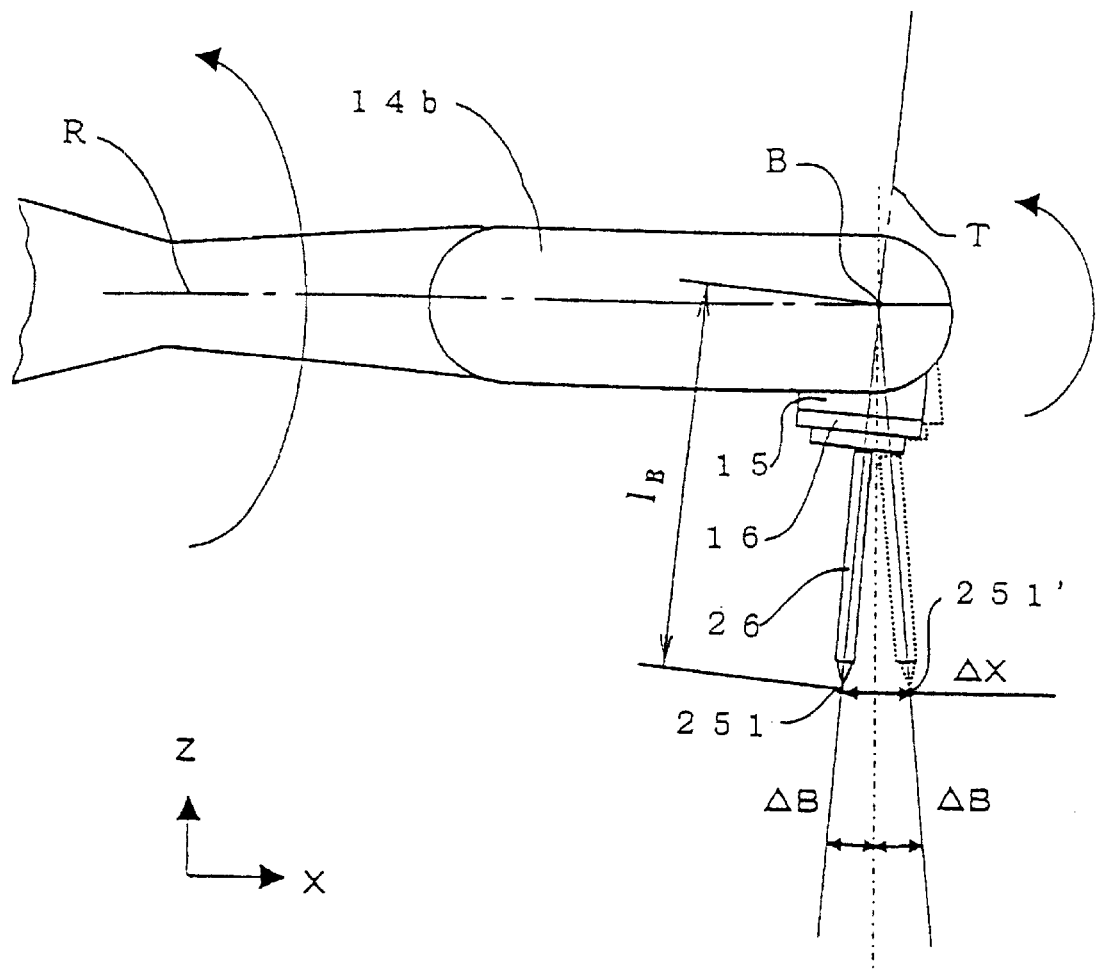
FIG. 5 is the first explanatory view of a calibration method according to the preferred embodiment.

FIG. 5 is an explanatory view showing a calibration method of a rocking axis B. Herein, an angle of the rocking axis B at which the rotating axis T becomes parallel to the rotating axis R is made into the origin of the rocking axis B, and a posture at which the wrist portion 15 is turned by 90 degrees from the origin around the rocking axis B is made into a commencing posture, wherein the wrist tip end portion 16 is connected to the calibrating device (not illustrated) via the fixture 26. Next, an instruction is provided to the robot 1 without moving the reference point 251, by which the rotating portion 14b of the upper arm is turned by 180 degrees around the rotating axis R, and the wrist 15 is turned reversely 90 degrees around the rocking axis B, that is, so as to turn −90 degrees if an instruction is +90 degrees at the commencing posture, whereby an terminating posture is taken. At this time, the difference between the reference point 251 at the commencing posture and the reference point 251' at the terminating posture, that is, a deviation of the reference points 251, must be zero if the origin of the rocking axis B is correct. Further, since the rotation of the rotating portion 14b of the upper arm around the rotating axis R is a 180-degree turn with reference to the commencing posture, the position of origin of the rotating axis R does not pertain to displacement of the reference point 251. The relationship between a deviation Ax of the reference point 251 in the X-axis direction, which has been obtained by the calibrating device 2, and the origin error ΔB of the rocking axis B is expressed as follows;

$$\Delta X = 2 l_B \sin(\Delta B) \qquad (7)$$

Therefore, the ΔB is obtained by the following expression:

$$\Delta B = \sin^{-1}\{\Delta X/(2 l_B)\} \qquad (8)$$

where $l_B$ is a distance from the rocking axis B to the reference point 251 and is an already known value measured in advance.

FIG. 6 is an explanatory view showing a method of calibrating the rotating axis R, wherein (a) is a plan view, and (b) is a front elevational view. Herein, a posture is determined as a commencing posture, where degree of angle of the rotating axis R at which the rocking axis B becomes horizontal is used as the origin of the rotating axis R, the rotating axis 14b of the upper arm is turned by 90 degrees, the wrist 15 is turned by the appointed degrees of an angle around the axis B, the fixture 26 becomes parallel to the Y axis, and the tip end portion 16 of the wrist is connected to a calibrating device (not illustrated) by the fixture 26. Next, an instruction is provided to the robot 1, which causes a swivel head (not illustrated) to swivel without moving the reference point 251, causes the rotating portion 14b of the upper arm to be reversely turned 90 degrees, that is, −90 degrees if the instruction at the commencing posture is +90 degrees, and causes a terminating posture to be taken. The terminating posture becomes a mirror image with respect to the commencing posture when the XZ plane of the robot coordinates is used as a reference. At this time, a difference between the reference point 251 at the commencing posture and the reference point 251 at the terminating posture, that is, displacement of the reference point 251, must be zero if the origin of the rotating axis R is correct. The relationship between displacement ΔZ of the reference point in the Z axis direction, which is obtained by the calibrating device 2, and the origin error ΔR of the rotating axis R can be expressed by the following expression.

$$\Delta Z = 2 l_B \sin(\Delta R) \qquad (9)$$

Therefore, ΔB is obtained from the following expression.

$$\Delta R = \sin^{-1}\{\Delta Z/(2 l_B)\} \qquad (10)$$

Herein, the position of the origin of the vertical axis S does not pertain to the displacement of the reference point 251.

Figure 7:
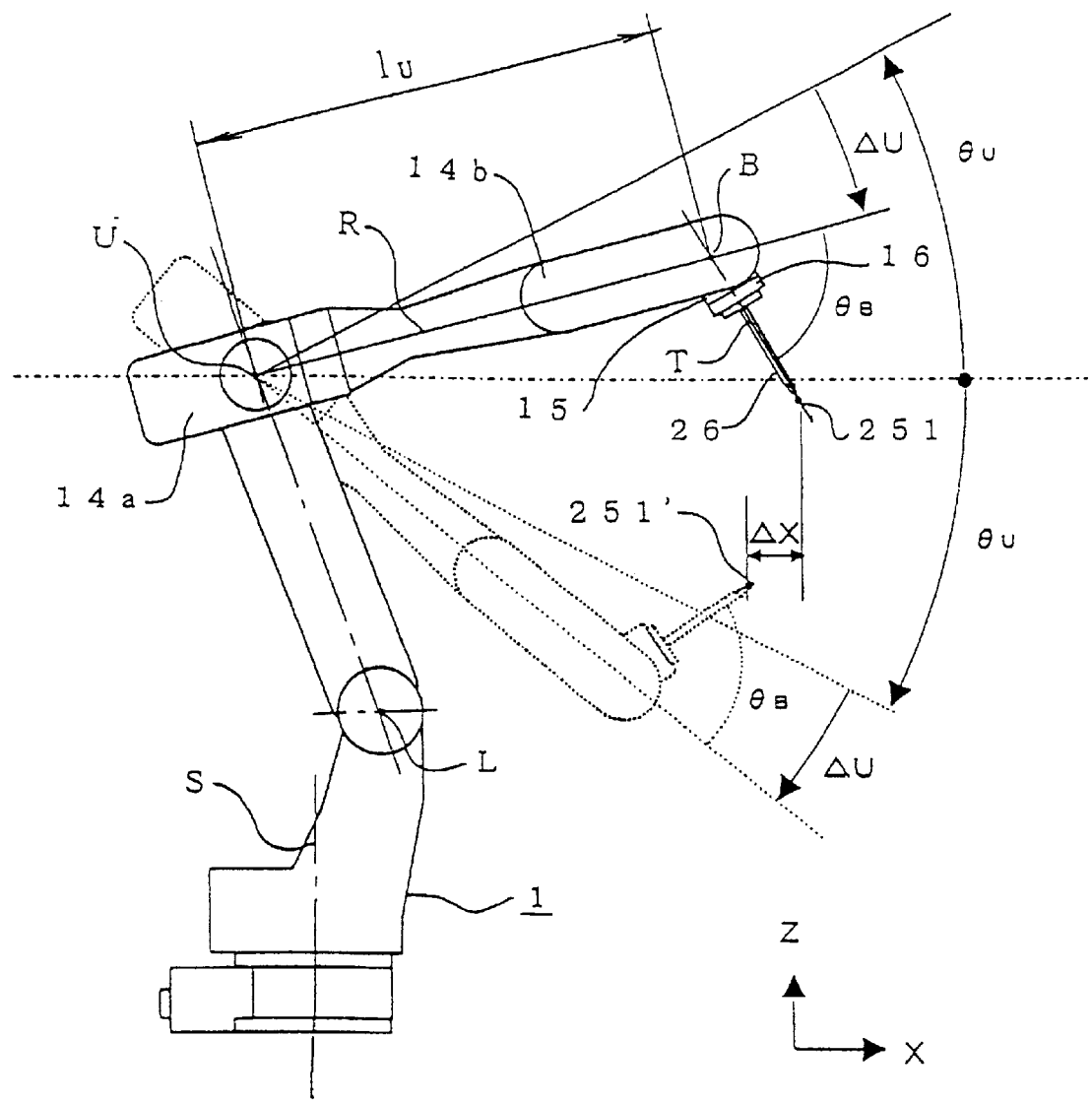
FIG. 7 is the third explanatory view of a calibration method according to the preferred embodiment.

FIG. 7 is an explanatory view showing a method of calibration of the horizontal axis U. Herein, a posture is determined as a commencing posture, where the degree of angle of the horizontal axis U at which the rotating axis R becomes horizontal is used as the origin of the horizontal axis U, the fixing portion 14a of the upper arm is turned only $\theta_u$ from the origin around the horizontal axis U, and the wrist 15 is turned only $\theta_B$ around the B axis, and the tip end portion 16 of the wrist is connected to a calibrating device (not illustrated) via the fixture 26. Next, an instruction is provided to the robot 1, which causes the fixing portion 14a of the upper arm to be turned only $-\theta_u$ from the origin around the horizontal axis U, causes the rotating portion 14b of the upper arm to be turned only 180 degrees around the rotating axis R, and causes the vertical axis S, horizontal axis L and rocking axis B to remain unchanged, whereby the robot is caused to take a terminating posture. The posture of the tip end side from the fixing portion 14 of the upper arm, of the terminating posture, becomes a mirror image with respect to the commencing posture when the horizontal plane including the horizontal axis U is used as a reference. Therefore, a difference between the reference point 251 at the commencing posture and the reference point 251' at the terminating posture, that is, a component of the displacement at the reference point 251 in the X axis direction, must be zero if the origin of the horizontal axis U is correct. The relationship between displacement ΔX of the reference point 251 in the X axis direction, which is obtained by the calibrating device 2, and the origin error ΔU of the horizontal axis U can be expressed by the following expression.

$$\Delta X = 2\{1_U + 1_B \cos(\theta_B)\}(\cos(\Delta U) - 1)\cos(\theta_U) \quad (11)$$

Therefore, ΔU is obtained from the following expression.

$$\Delta U = \cos^{-1}(1 + \Delta X/\alpha) \quad (12)$$

However, $1_u$ is the distance from the horizontal axis U to the rocking axis B and is an already known value measured in advance, which is $\alpha = 2\{1_U + 1_B \cos(\theta_B)\}\cos(\theta_U)$.

Figure 8:
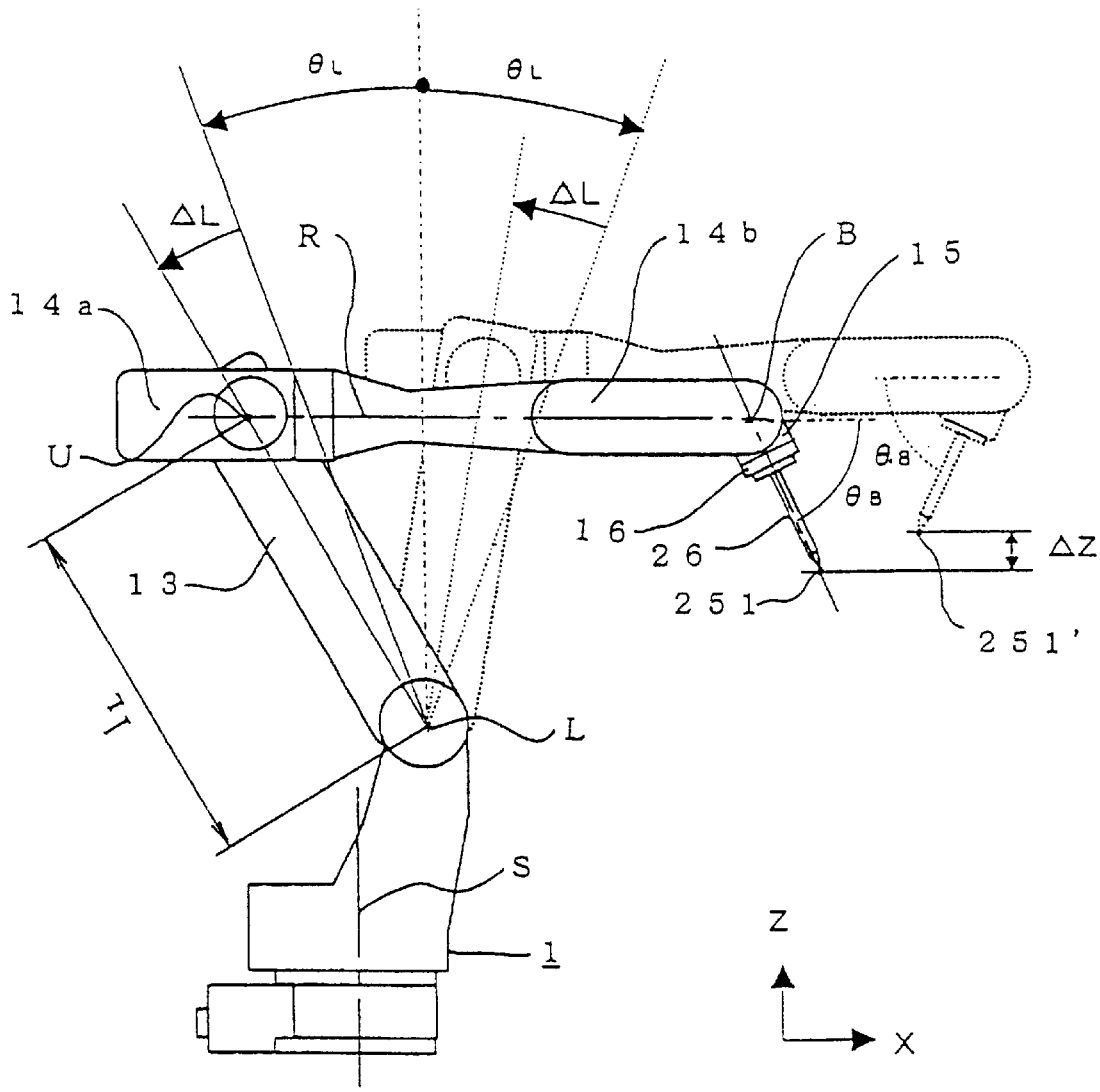
FIG. 8 is the fourth explanatory view of a calibration method according to the preferred embodiment.

FIG. 8 is an explanatory view showing a calibrating method of the horizontal axis L. Herein, a posture is determined as a commencing posture, where the degree of angle of the horizontal axis L at which the lower arm 13 becomes vertical is used as the origin of the horizontal axis L, the lower arm 13 is turned only $\theta_L$ from the origin around the horizontal axis L, and the wrist 15 is turned only $\theta_B$ around the B axis, and the tip end portion 16 of the wrist is connected to a calibrating device (not illustrated) via the fixture 26. Next, an instruction is provided to the robot 1, which causes the lower arm 13 to be turned only $-\theta_L$ from the origin around the horizontal axis L, causes the wrist 15 to be turned clockwise around the B axis, and causes the wrist 15 to become symmetrical at the left and right sides with respect to the commencing posture, and causes the vertical axis S, horizontal axis U, rotating axis R and rotating axis T to remain unchanged, thereby causing the robot 1 to take a terminating posture. Since the lower arm 13 is inclined forward or backward to the same degree of angle with respect to the vertical posture, a component of a difference, in the Z axis direction, between the reference point 251 at the commencing posture and the reference point 251' at the terminating posture, that is, displacement of the reference point 251 in the Z axis direction, must be zero if the origin of the horizontal axis L is correct. The relationship between the displacement ΔZ of the reference point 251 in the Z axis direction, which is obtained by the calibrating device 2, and the origin error ΔL of the horizontal axis L can be expressed by the following expression.

$$\Delta Z = 2 1_L \cos(\theta_L)\{\cos(\Delta_L) - 1\} \quad (13)$$

Therefore, the ΔL is obtained from the following expression.

$$\Delta L = \cos^{-1}\{1 + \Delta Z/2 1_L \cos(\theta_L)\} \quad (14)$$

However, $1_L$ is the distance from the horizontal axis L to the horizontal axis U and an already known value measured in advance.

The calibration is carried out with respect to a certain axis, and the origin of the axis is corrected on the basis of the results, and the calibration is performed again. If this operation is repeated until the origin error becomes smaller than an appointed reference, the accuracy of the calibration can be further improved.

Further, if procedures of the calibration are programmed in the calculating means along with selection features of motions of the robot 1, it is needless to say that operations other than connection and separation between the robot 1 and the calibrating device 2 can be unmanned and automated. As described above, according to the invention, the following effects can be achieved.

(1) Since the object to be measured by the calibration has only three degrees of freedom, the structure of the calibration is made comparatively simple, and production costs may be lowered.

(2) Since it is not necessary to measure the positional relationship between a robot and a calibrating device, it is easy to install the calibrating device.

(3) It is easy to automate operations other than connection and disconnection between a robot and a calibrating device.

(4) Since the range in which a robot operates is narrow with respect to operation for calibration, the motion stroke of the calibrating device may be small. Therefore, the calibrating device is compact and has good portability. For example, if the robot which is in operation is brought into contact with a workpiece and the origin slips, a calibrating device may be brought to the site and installed at site, whereby a calibration may be carried out.

INDUSTRIAL APPLICABILITY

The present invention is applicable to a calibrating device and method for an articulated robot.

What is claimed is:

1. A device for calibrating a robot, comprising a fixing base; a first slide base slidably attached to said fixing base on a straight line thereof; a first displacement detecting means for measuring an amount of movement of said first sliding base with respect to said fixing base; a second sliding base slidably attached to said first sliding base on a straight line orthogonal to the sliding direction of the first sliding base; a second displacement detecting means for measuring an amount of movement of said second sliding base with respect to said first sliding base; a third sliding base slidably attached to said second sliding base on a straight line orthogonal to the sliding direction of the first and second sliding bases; a third displacement detecting means for measuring an amount of movement of said third sliding base with said second sliding base; and a universal joint, one end of which is fixed at said third sliding base, the other end of which is fixed at a tip end portion of a wrist of the robot, wherein one end is provided with a conical trapezoidal recess and a magnet incorporated at the bottom of said recess, and said other end is provided with a sphere detachably fitted into said recess.

2. A method for calibrating a robot, wherein the tip end portion of the wrist of the robot is connected to the fixture of the device for calibrating a robot set forth in claim 1, an instruction (command) for changing only the posture of said robot is provided to said robot to cause the robot to move, so that with the position of the center point of a rotating axis of said universal joint fixed constant, an axis other than an object axis to be calibrated is not moved or the axis other than the object axis to be calibrated is moved until it becomes axially symmetrical with respect to an initial angle, a movement amount of the position of the center point of a rotating axis of said universal joint, which is produced by an error in robot parameters, is measured, and the robot parameters are corrected by comparing and calculating the amount of movement.

3. A method for calibrating a robot wherein the tip end portion of the wrist of the robot is connected to the fixture of the device for calibrating a robot set forth in claim 1, characterized in that an instruction which causes said robot to take a posture in the form of a mirror image with respect to the initial posture of said robot is provided to said robot with the position of the center point of a rotating axis of said universal joint kept constant in order to cause the robot to operate, a movement amount of the position of the center point of a rotating axis of said universal joint, which is produced by an error in the robot parameters, is measured, and the robot parameters are corrected by comparing and calculating the amount of movement.

4. A method for calibrating a robot, wherein the tip end portion of the wrist of the robot is connected to said fixture of the device for calibrating a robot set forth in claim 1, an instruction is provided to the robot, which causes an object axis of calibration to be turned from an initial position to the position where it becomes a symmetrical axis with respect to a plane including the object axis, and does not move any axis other than the object axis, components are measured, which are orthogonal to an object axis of a vector obtained by projecting the movement amount of the position of the center point of a rotating axis of said universal joint, which is produced by an error in robot parameters, onto said plane, and the robot parameters are corrected by comparing and calculating said components.

5. A method for calibrating a robot, wherein the tip end portion of the wrist of the robot is connected to said fixture of the device for calibrating a robot set forth in claim 1, an instruction which changes only the posture of said robot with the position of the center point of a rotating axis of said universal joint kept constant is provided to said robot to cause the robot to operate, a movement amount of the position of the center point of the rotating axis of said universal joint, which is produced by an error in robot parameters, is measured, said robot is actuated again with the position instruction of said robot corrected by the amount of movement, the measurement of the amount of movement and correction of the position instruction are repeated until the movement amount of the position of the center point of the rotating axis of said universal joint becomes sufficiently small, and the robot parameters are corrected by comparing and calculating angle instruction values of respective joints of the robot and initial angle instruction values when said amount of movement becomes sufficiently small.

6. A method for calibrating a robot, wherein the tip end portion of the wrist of the robot is connected to said fixture of the device for calibrating a robot set forth in claim 1, wherein said calibrating device is connected to a calculating means by a signal line, said calculating means is connected to a control device of said robot by a signal line, and calibration of said robot is automatically repeated in compliance with programs incorporated in said calculating means until errors in the position at the tip end portion of said robot become smaller than appointed values.

* * * * *